(12) United States Patent
Ryu et al.

(10) Patent No.: US 7,297,097 B2
(45) Date of Patent: Nov. 20, 2007

(54) LIFT TYPE WEIGHT MEASURING CENTRIFUGE

(75) Inventors: Heui-Geun Ryu, Seoul (KR); Hak-Chul Kim, Bucheon Gyeonggi-Do (KR)

(73) Assignee: Hanlab Corporation, Seoul (KR)

( * ) Notice: Subject to any disclaimer, the term of this patent is extended or adjusted under 35 U.S.C. 154(b) by 0 days.

(21) Appl. No.: 10/566,936

(22) PCT Filed: Nov. 18, 2004

(86) PCT No.: PCT/KR2004/002987

§ 371 (c)(1),
(2), (4) Date: Feb. 2, 2006

(87) PCT Pub. No.: WO2005/100933

PCT Pub. Date: Oct. 27, 2005

(65) Prior Publication Data

US 2007/0027014 A1 Feb. 1, 2007

(30) Foreign Application Priority Data

Apr. 19, 2004 (KR) .......................... 2004-0026526

(51) Int. Cl.
*B04B 5/02* (2006.01)
*B04B 9/14* (2006.01)
*B04B 13/00* (2006.01)

(52) U.S. Cl. .................... 494/10; 494/20; 494/82; 74/572.4

(58) Field of Classification Search ............... 494/1, 494/10, 12, 20, 33, 82, 84; 73/457–458; 74/573 R, 572.4; 68/23.1, 23.2; 210/85, 210/144

See application file for complete search history.

(56) References Cited

U.S. PATENT DOCUMENTS

| 6,949,063 | B2 * | 9/2005 | Baik et al. ................... 494/1 |
| 7,025,714 | B2 * | 4/2006 | Escal .......................... 494/1 |
| 7,115,090 | B2 * | 10/2006 | Lagarde ..................... 494/10 |
| 2004/0018927 | A1 | 1/2004 | Baik et al. |
| 2005/0026765 | A1 * | 2/2005 | Escal ........................ 494/20 |
| 2006/0252627 | A1 * | 11/2006 | Kim et al. ................. 494/20 |
| 2007/0027014 | A1 * | 2/2007 | Ryu et al. .................. 494/10 |

FOREIGN PATENT DOCUMENTS

| JP | 56108916 | 8/1981 |
| JP | 07080355 | 3/1995 |
| JP | 10038667 | 2/1998 |
| WO | WO 2006054828 A1 * | 5/2006 |

* cited by examiner

*Primary Examiner*—Charles E. Cooley
(74) *Attorney, Agent, or Firm*—IPLA P.A.; James E. Bame

(57) ABSTRACT

Disclosed is a lift type weight measuring centrifuge which is able to measure the weight of a measurement object after spatially isolating the measurement object. The centrifuge includes an upper sensing plate to move upwards, and a weight sensing mechanism provided under the upper sensing plate to sense a weight of the measurement object seated on the upper sensing plate. The centrifuge further includes a lift mechanism to move both the upper sensing plate and the weight sensing mechanism vertically, and a control device to control the operation of the lift mechanism and to measure the weight of the measurement object using a weight sensing signal output from the weight sensing mechanism.

2 Claims, 8 Drawing Sheets

LIFT TYPE WEIGHT MEASURING CENTRIFUGE

TECHNICAL FIELD

The present invention relates, in general, to lift type weight measuring centrifuges and, more particularly, to a lift type weight measuring centrifuge which is able to measure the weight of measurement object after spatially isolating the measurement object from a main body.

BACKGROUND ART

Generally, centrifuges are apparatuses in which a rotor holding a bucket, in which a sample is placed, is rotated at high speed to apply high centrifugal force to the sample, so that a high density fraction is moved radially outwards and a low density fraction is moved radially inwards, thus separating the fractions from each other. FIG. 1 is a perspective view showing a conventional automatic balancing centrifuge. As shown in FIG. 1, the automatic balancing centrifuge includes a base 110, a centrifugal motor 120 which is supported by the base 110, a rotor 130 which is coaxially coupled to the centrifugal motor 120 and has a rotor lever 160, and a bucket 140 which has a predetermined volume to contain therein a desired sample 150 to be separated into fractions. The rotor 130 is provided with an upper housing 172 having a cubic cap shape and a lower housing 174 in which one rotor lever 160 is mounted. The rotor lever 160 has a lever central body 161 which is positioned at the center of the rotor lever 160, and two rotating arms 162 which are coupled at opposite ends of the lever central body 161 by hinges 163, thus being rotatable vertically. A pressure sensor 168 is mounted on a lower portion of each of the rotating arms 162 provided at the opposite ends of the lever central body 161, so as to directly sense the pressure of the rotating arm 162. The rotating arms 162 are balanced by the support of the pressure sensors 168. Two lever guide holes 166 are provided at opposite sides on outer surfaces of the upper and lower housings 172 and 174. The rotor lever 160 is inserted through the lever guide holes 166 and is horizontally movable in the lever guide holes 166 to maintain balance. In the drawings, the reference numeral 164 denotes a stop protrusion which is provided on each inner surface of the rotating arms 162 to hold the bucket 140. The reference numeral 142 denotes a stop groove which is formed on the bucket 140 to engage with the stop protrusion 164. In this construction, when measuring values of the opposite pressure sensors 168 are different in the state in which the samples 150 are placed in the buckets 140, a lever moving motor 182 provided in the upper housing 172 is operated. Then, the rotor lever 160 is horizontally moved by the operation of the lever moving motor 182, thus becoming balanced.

According to such a conventional automatic balancing centrifuge, imbalance of samples supported by the rotor lever is sensed prior to every centrifugal operation and, thereafter, the rotor lever is moved according to the imbalance sensing result, thus automatically balancing the centrifuge. Therefore, the samples are prevented from damage due to imbalance of the rotor and, as well, the lifetime of the automatic balancing centrifuge is extended. However, the conventional automatic balancing centrifuge is problematic in that because the weight sensor such as the pressure sensors are frequently struck by the buckets containing the measurement objects, the weight sensor is easily damaged.

DISCLOSURE OF INVENTION

Technical Problem

Accordingly, the present invention has been made keeping in mind the above problems occurring in the prior art, and an object of the present invention is to provide a lift type weight measuring apparatus which has a structure capable of separating a weight sensor from a measurement object so that the weight sensor is prevented from damage due to frequent contact between the weight sensor and the measurement object.

Technical Solution

In order to accomplish the above object, the present invention provides a lift type weight measuring apparatus, including: an upper sensing plate to move upwards, thus spatially isolating a measurement object; a weight sensing means provided under the upper sensing plate to sense a weight of the measurement object seated on the upper sensing plate; a lift means to move both the upper sensing plate and the weight sensing means vertically; and a control means to control an operation of the lift means and to measure the weight of the measurement object using a weight sensing signal output from the weight sensing means.

Advantageous Effects

In the present invention, a lift type weight measuring apparatus is able to separate a weight sensor from a measurement object, so that the weight sensor is prevented from damage due to frequent contact between the weight sensor and the measurement object.

BEST MODE FOR CARRYING OUT THE INVENTION

Hereinafter, a lift type weight measuring apparatus according to a preferred embodiment of the present invention will be described in detail with reference to the attached drawings.

Mode for the Invention

Implementation in an automatic balancing centrifuge will be explained as an example.

Figure 1:
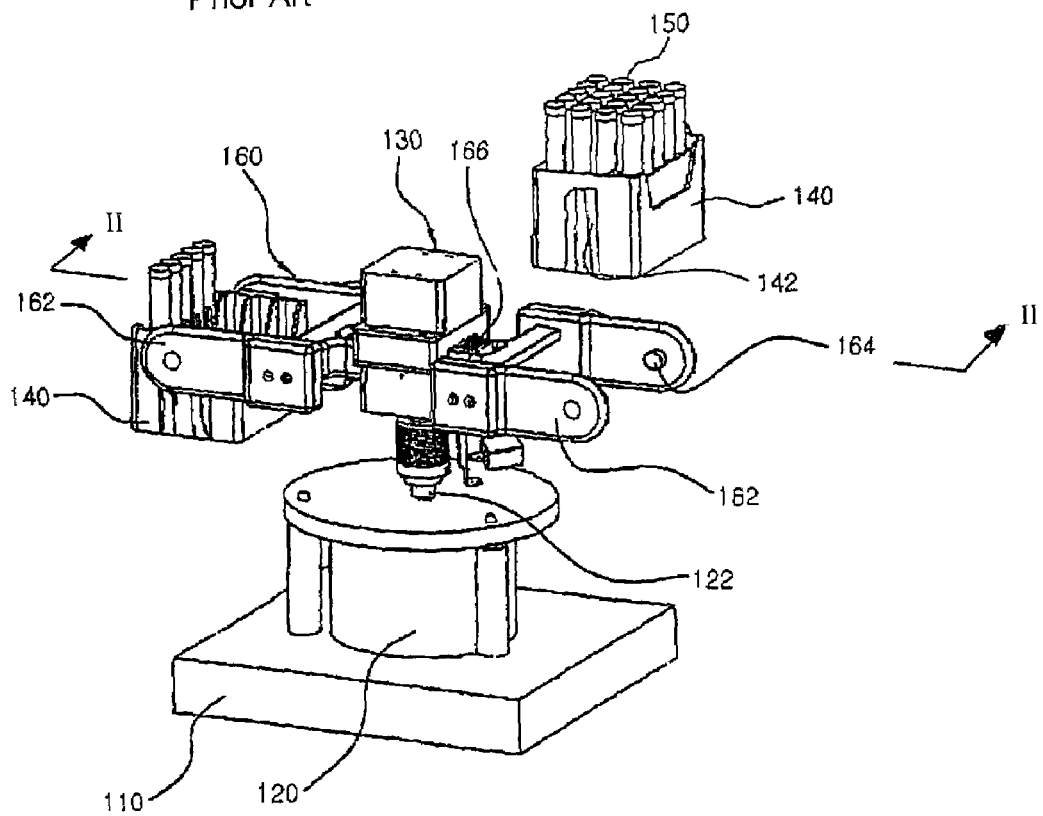
FIG. 1 is a perspective view showing a conventional automatic balancing centrifuge.
Figure 2:
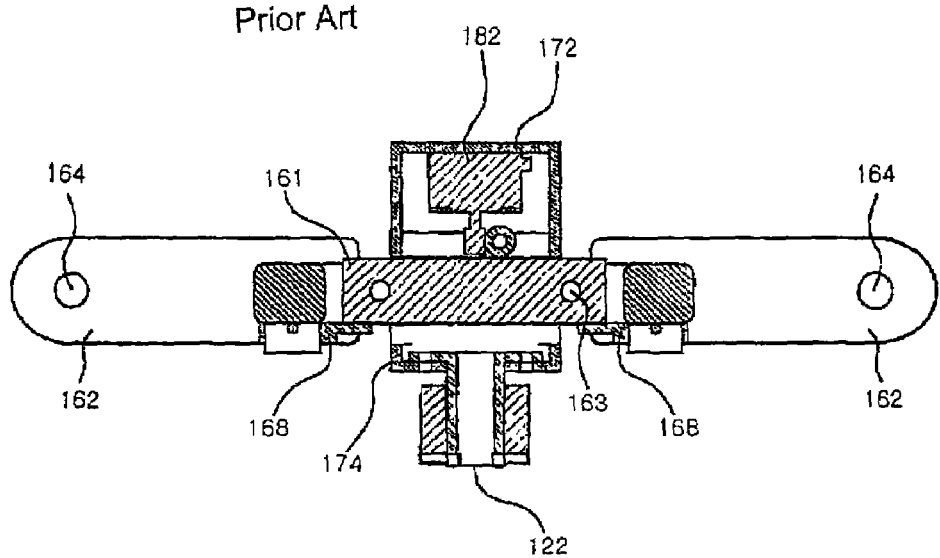
FIG. 2 is a sectional view of a rotor of the automatic balancing centrifuge taken along the line II-II of FIG. 1.
Figure 3:
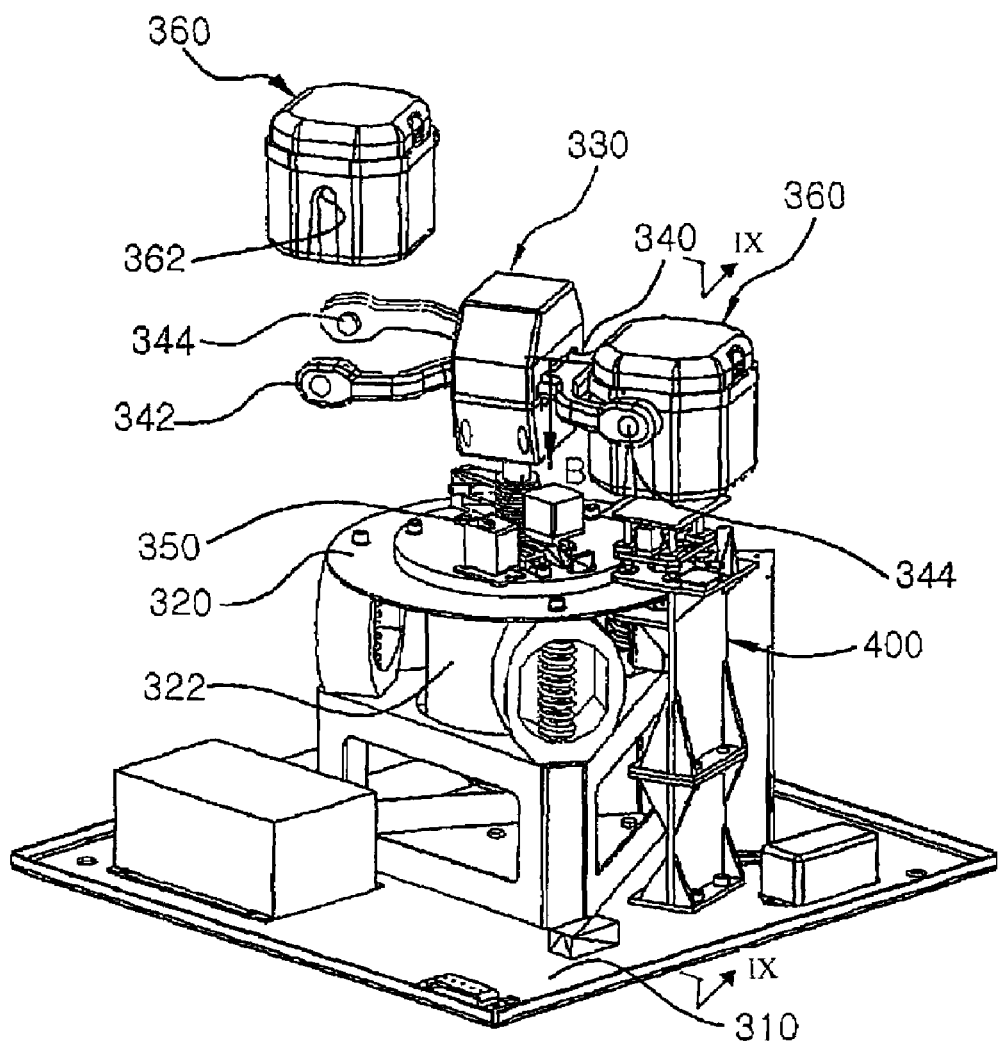
FIG. 3 is a perspective view of an automatic balancing centrifuge having a lift type weight measuring centrifuge according to an embodiment of the present invention.
Figure 6:
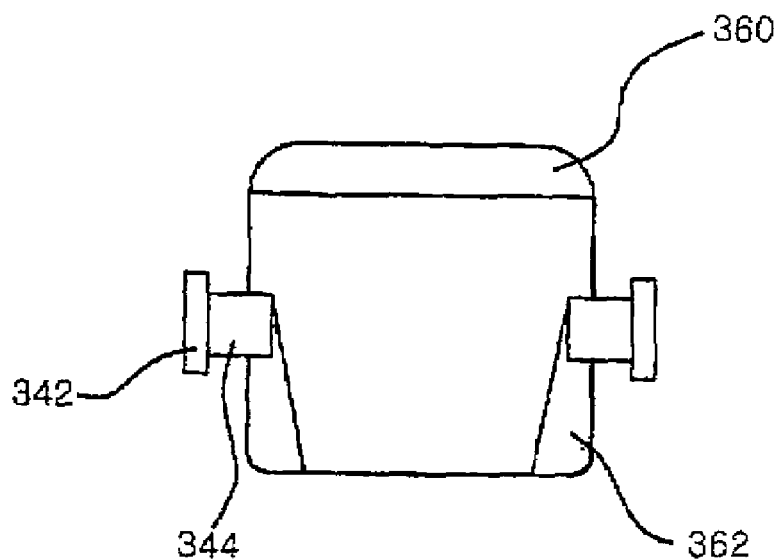
FIG. 6 is a sectional view showing the relationship between a stop protrusion of a rotating arm and a stop groove of a bucket of FIG. 3 before a weight measurement.
Figure 7:
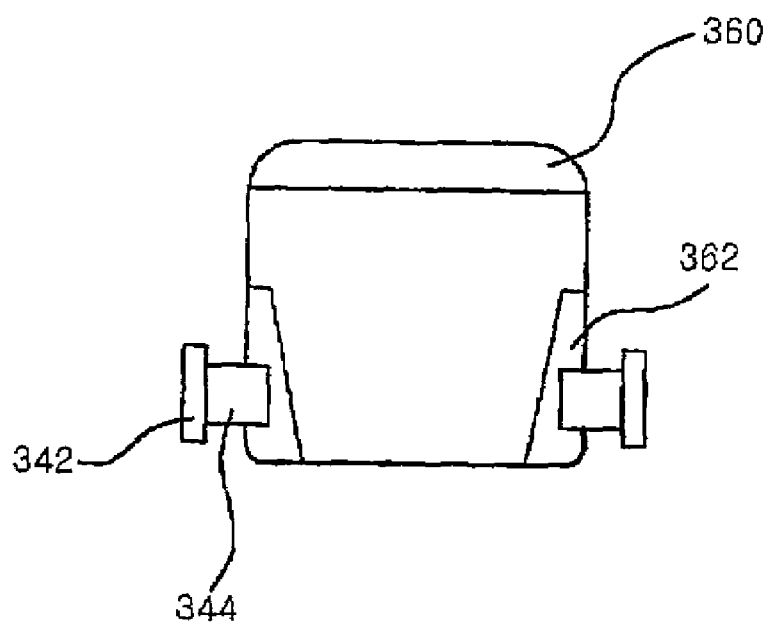
FIG. 7 is a sectional view showing the relationship between the stop protrusion of the rotating arm and the stop groove of the bucket of FIG. 3 during the weight measurement.

FIG. 3 is a perspective view of an automatic balancing centrifuge having a lift type weight measuring apparatus according to an embodiment of the present invention. FIG. 6 is a sectional view showing the relationship between a stop protrusion of a rotating arm and a stop groove of a bucket of FIG. 3 before a weight measurement. FIG. 7 is a sectional view showing the relationship between the stop protrusion of the rotating arm and the stop groove of the bucket of FIG. 3 during the weight measurement. As shown in FIG. 3, the automatic balancing centrifuge includes a base 310 on which every component is loaded, a motor support plate 320 which is mounted on the base 310, and a centrifugal motor 322 which is supported by the motor support plate 320. The automatic balancing centrifuge further includes a rotor 330 which is provided with a rotor lever 340 and which is coaxially coupled to the centrifugal motor 322, and a pair of buckets 360 containing therein samples to be separated into fractions. The rotor 330 may have the same construction as that of the above-mentioned conventional automatic balancing centrifuge. Each bucket 360 containing the sample has a pair of stop grooves 362. Thus, when each bucket 360 is coupled to each of a plurality of rotating arms 342, the stop grooves 362 of the bucket 360 engage with a pair of stop protrusions 344 of each rotating arm 342, so that the bucket 360 is reliably supported by the rotating arm 342. Here, because the stop protrusions 344 must not interference with each bucket 360 being weighed, each stop groove 362 of each bucket 360 must gradually enlarge in width and depth from top to bottom. In the drawings, the reference numeral 350 denotes a motor shaft which couples the centrifugal motor 322 to the rotor 330. The reference numeral 400 denotes the lift type weight measuring apparatus of the present invention which is mounted on the base 310 of the centrifuge.

Figure 4:
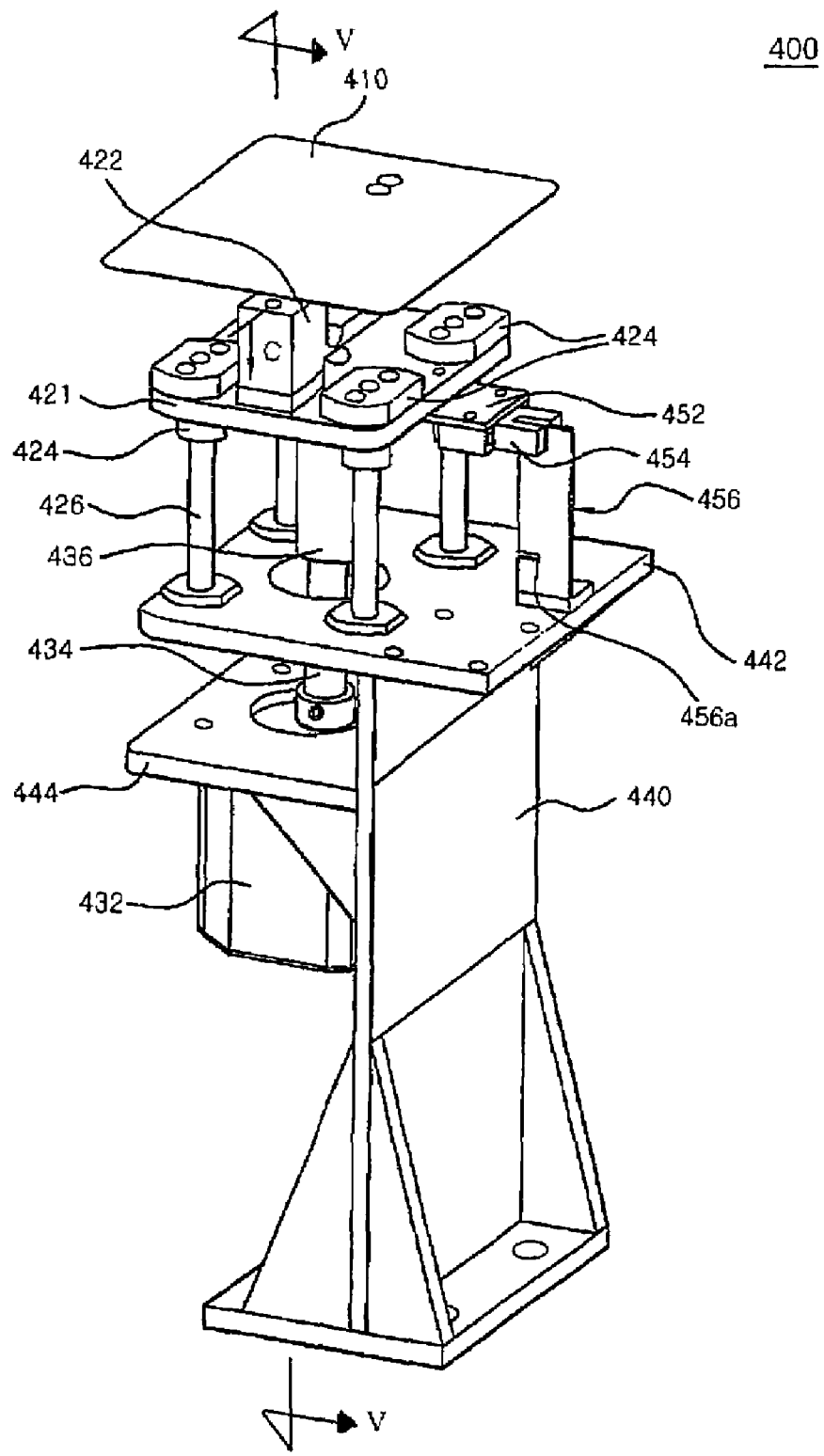
FIG. 4 is a perspective view showing an enlargement of the lift type weight measuring centrifuge of FIG. 3.
Figure 5:
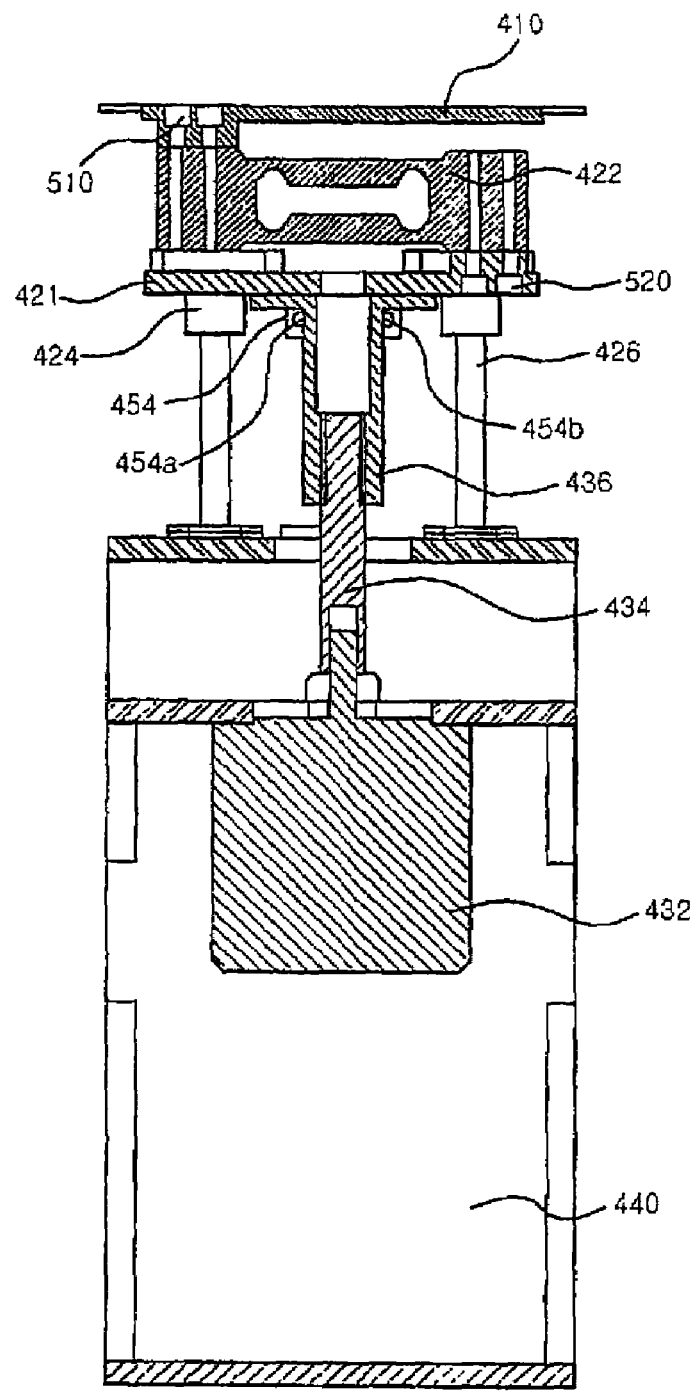
FIG. 5 is a sectional view taken along the line V-V of FIG. 4.

FIG. 4 is a perspective view showing an enlargement of the lift type weight measuring apparatus of FIG. 3. FIG. 5 is a sectional view taken along the line V-V of FIG. 4. As shown in FIGS. 4 and 5, the lift type weight measuring apparatus 400 also known as centrifuge includes a vertical frame 440 to which both an upper horizontal frame plate 442 and a lower horizontal frame plate 444 are fastened. The weight measuring apparatus 400 further includes a lift drive motor 432 which is fastened to the lower horizontal frame plate 444, and a rotating shaft 434 which is axially coupled to the lift drive motor 432 and, thus, is rotated by the operation of the lift drive motor 432. The weight measuring apparatus 400 further includes a central slide 436 which is screwed to the rotating shaft 434 to convert the rotation of the lift drive motor 432 into vertical linear movement. The weight measuring apparatus 400 further includes an upper sensing plate 410 on which the bucket 360 is seated, and a weight sensor 422 which is coupled to a lower surface of the upper sensing plate 410 by a locking bolt to measure the weight of the bucket 360. The weight measuring apparatus 400 further includes a lower sensing plate 421 which is coupled to a lower end of the weight sensor 422 by a locking bolt and which is coupled to an upper end of the central slide 436. The weight measuring apparatus 400 further includes at least one guide 426 which is coupled to the upper horizontal frame plate 442 to help the lower sensing plate 421 correctly move vertically without shaking. Preferably, the weight measuring apparatus 400 further includes a linear bush 424 to reduce friction between the guide 426 and the lower sensing plate 421 during the vertical movement of the lower sensing plate 421 by the operation of the lift drive motor 432. Furthermore, it is preferred that the weight measuring apparatus 400 include a position sensor 454 to correctly stop the upper sensing plate 410 at its desired higher or lower position. The position sensor 454 is supported by a position sensor support 452 which is coupled to the lower sensing plate 421. A light emitting device 454b is provided on a side of the position sensor 454. A light receiving device 454a is provided on the other side of the position sensor 454 to receive light emitted from the light emitting device 454b. Thus, the position sensor 454 senses a mark formed on a position sensing panel 456 which is attached to the upper horizontal frame plate 442. In detail, upper and lower light openings 456b and 456a are respectively framed at predetermined higher and lower positions on the position sensing panel 456.

In the meantime, the weight sensor 422 is embodied by a device, such as a strain gauge, piezoelectric sensor, etc. The position sensor 454 is variously embodied by a device, such as an interrupt type photocoupler, or a switch, etc. Furthermore, a metal lubricant may be used in place of the linear bush 424. It is preferred to use a stepping motor as the lift drive motor 432.

Figure 8:
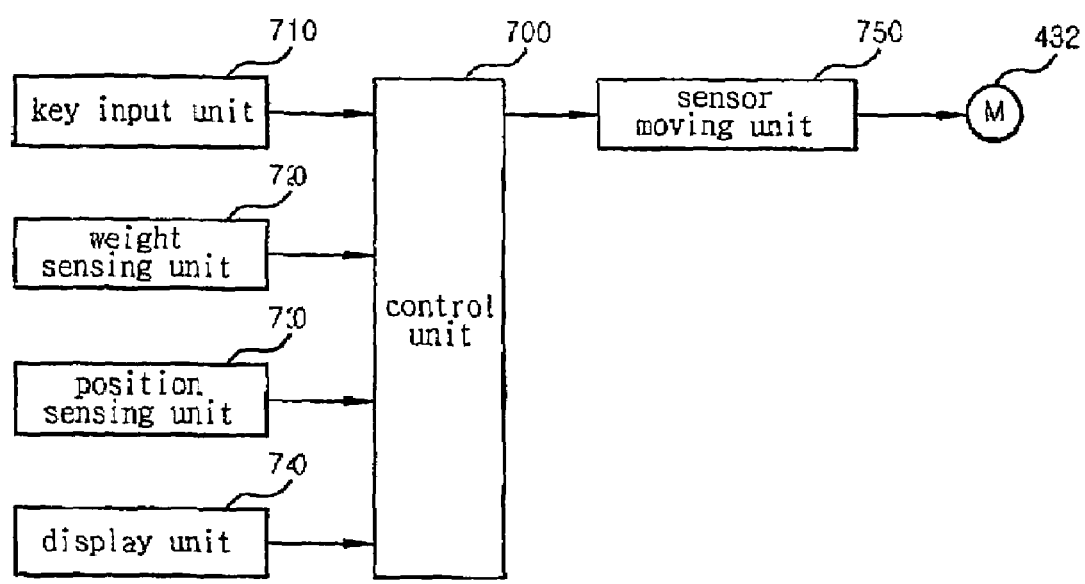
FIG. 8 is an electrical block diagram of the lift type weight measuring centrifuge of the present invention.

FIG. 8 is an electrical block diagram of the lift type weight measuring apparatus of the present invention. As shown in FIG. 8, an electrical construction of the lift type weight measuring apparatus of the present invention includes a position sensing unit 730 which is provided with both the position sensor 454 and its peripheral devices, and a weight sensing unit 720 which is the weight sensor 422 and its peripheral devices. The electrical construction of the lift type weight measuring apparatus further includes a key input unit 710 which is required to input various keys necessary for the weight measurement, and a display unit 740 which displays various kinds of information about the operation of the weight measuring apparatus. The electrical construction of the lift type weight measuring apparatus further includes a sensor moving unit 750 which vertically moves the upper sensing plate 410 using the lift drive motor 432, and a control unit 700 which control the operation of the entire apparatus.

Figure 9:
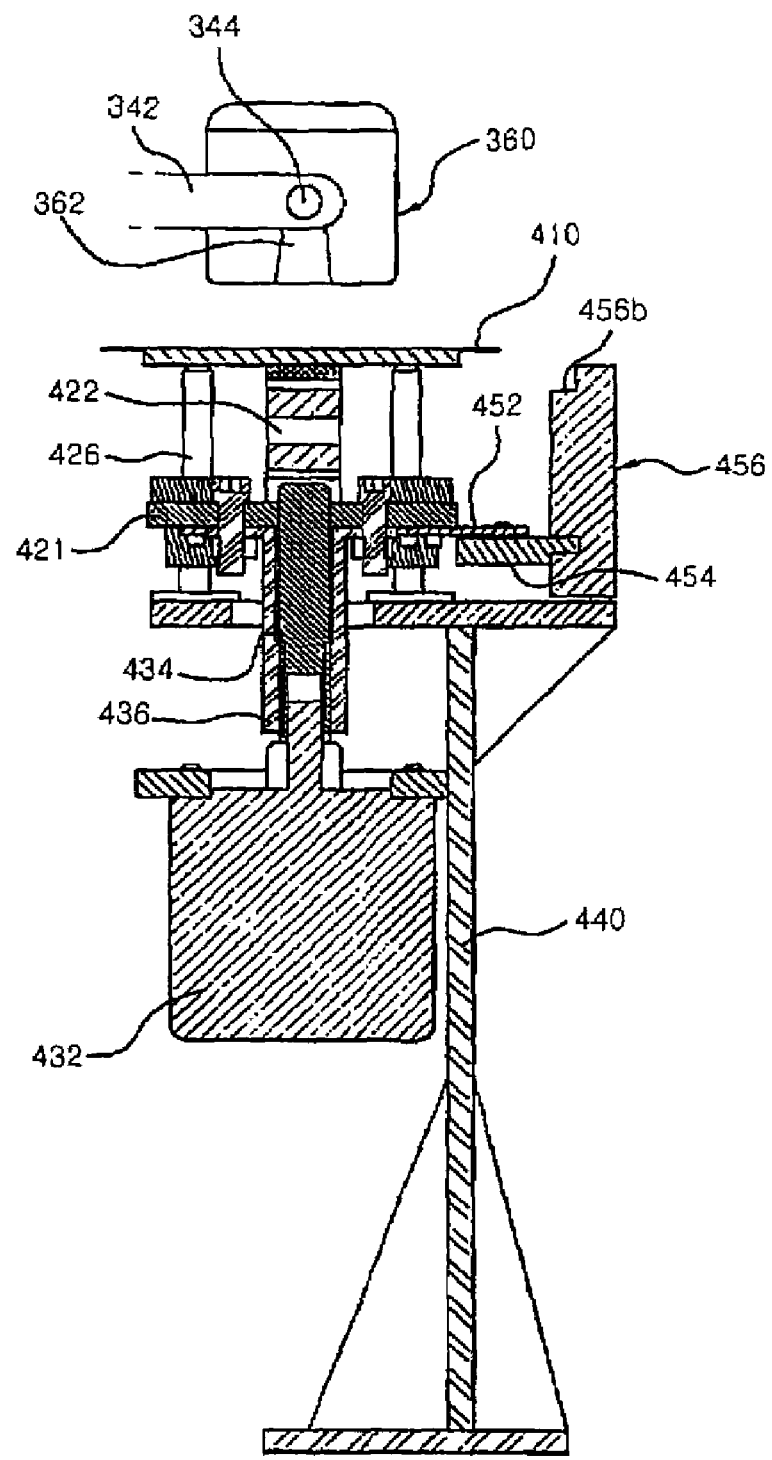
FIG. 9 is a sectional view taken along the line IX-IX of FIG. 3 to show a state of the lift type weight measuring centrifuge before the weight measurement.

FIG. 9 is a sectional view of a part of the centrifuge taken along the line IX-IX of FIG. 3, in which the bucket 360 having therein a sample to be separated is not lifted. Every rotating arm 342 of the centrifuge is controlled by the movement of the rotor lever 340, such that the rotating arms 342 are in the same rotating track around the rotor 330. One rotating arm 342 is placed at a predetermined position over the weight measuring apparatus 400 by the operation of both the centrifugal motor 322 and a constant position sensor (not shown). At this time, a predetermined space must exist between the bucket 360 containing the sample and the upper sensing plate 410 to allow spatial variation in the rotating track of the bucket 360 due to centrifugal force during the rotation of the rotor lever 340.

Figure 10:
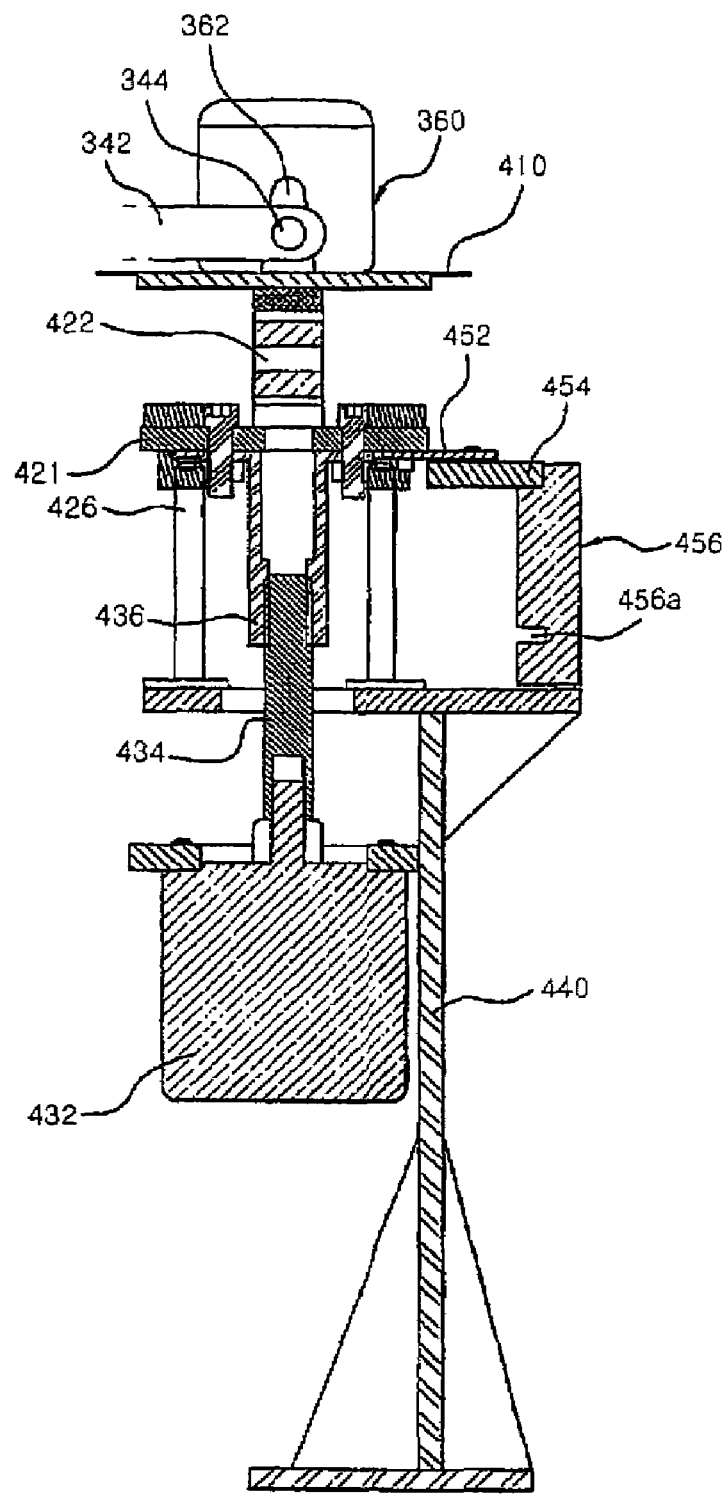
FIG. 10 is a view showing another state of the lift type weight measuring centrifuge during the weight measurement.

FIG. 10 is a view showing another state of the lift type weight measuring apparatus during the weight measurement. In the state of FIG. 10 the lift drive motor 432 is operated to measure the weight of the bucket 360 and lifts the lower sensing plate 421 upwards. At this time, the lift drive motor 432 is operated until the bucket 360, which is raised by the upper sensing plate 410, is placed at a predetermined position at which the bucket 360 does not interfere with its peripheral component, that is, the stop protrusions 344. This position can be determined by the position sensor 454 which senses the upper light opening 456b of the position sensing panel 456. The position signal sensed through the above-mentioned process is sent to the control unit 700. The control unit 700 gives a control command to the sensor moving unit 750, so that the rotation of the lift drive motor 432 is stopped. In this state, the weight sensing unit 720 senses the weight of the bucket 360 and transmits this weight sensing signal to the control unit 700. Then, the control unit 700 temporarily stores the weight sensing signal and transmits it to a main controller (not shown) of the centrifuge. Thereafter, the control unit 700 outputs a control signal to the sensor moving unit 750 to reversely rotate the lift drive motor 432, thus moving the lower sensing plate 421 downwards. In the downward movement of the lower sensing plate 421, the position sensor 454 moves downwards along with the lower sensing plate 421 and senses the lower light opening 456a formed at the lower position on the position sensing panel 456. Thereafter, this sensing signal is sent to the control unit 700. Then, the control unit 700 gives a control command to the sensor moving unit 750 so that the rotation of the lift drive motor 432 stops. At this time, the stop grooves 362 of the bucket 360 engage with the stop protrusions 344 of the rotating arm 342 again. The rotor 330 becomes rotatable. Next, the control unit 700 transmits the result of the measured weight of the relevant bucket 360 to the main controller of the centrifuge. The main controller of the centrifuge rotates the rotating arms 342 to 180 degrees to measure the weight of the other bucket 360 which is hung on the other rotating arm 342. Thereafter, the main controller notifies the control unit 700. Then, the control unit 700 measures the weight of the relevant bucket 360 through the above-mentioned weight measuring process and transmits the result to the main controller. According to the result, the main controller moves the rotor lever 340 horizontally to balance the rotating arms 342 and, thereafter, executes a centrifugal process.

The lift type weight measuring apparatus of the present invention is not limited to the above-mentioned embodiment, and various modifications are possible, without departing from the scope and spirit of the present invention. That is, in this specification, the example in which the lift type weight measuring apparatus is used in an automatic balancing centrifuge has been explained, but it can be used in other apparatuses.

What is claimed is:

1. A centrifuge, comprising; a centrifugal motor; a rotor coupled to an output shaft of the centrifugal motor; and a rotor lever mounted to the rotor to rotatably support a bucket containing a sample therein, wherein the centrifuge further comprises:

an upper sensing plate provided below a rotating track of the bucket, the upper sensing plate moving upwards to spatially isolate and seat the bucket;

weight sensing means provided under the upper sensing plate to sense a weight of the bucket seated on the upper sensing plate;

position sensing means to sense a predetermined high position and a predetermined low position of the upper sensing plate;

lift means to move both the upper sensing plate and the weight sensing means vertically; and control means to control an operation of the centrifugal motor, to control the lift means using a signal output from the position sensing means, and to determine the weight of the bucket using a signal output from the weight sensing means.

2. The centrifuge according to claim 1, further comprising: lift guide means to guide vertical movement of the lift means.

* * * * *